United States Patent
Donovan et al.

(10) Patent No.: US 10,488,846 B2
(45) Date of Patent: Nov. 26, 2019

(54) ADJUSTMENT OF A HALFTONING THRESHOLD

(71) Applicant: HEWLETT-PACKARD DEVELOPMENT COMPANY, L.P., Houston, TX (US)

(72) Inventors: David H. Donovan, San Diego, CA (US); Jacob T. Wright, San Diego, CA (US); Erica M. Fung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 121 days.

(21) Appl. No.: 15/539,973

(22) PCT Filed: Jan. 30, 2015

(86) PCT No.: PCT/US2015/013931
§ 371 (c)(1),
(2) Date: Jun. 26, 2017

(87) PCT Pub. No.: WO2016/122647
PCT Pub. Date: Aug. 4, 2016

(65) Prior Publication Data
US 2018/0011475 A1    Jan. 11, 2018

(51) Int. Cl.
*G06F 19/00*    (2018.01)
*G05B 19/4099*    (2006.01)
(Continued)

(52) U.S. Cl.
CPC ........ *G05B 19/4099* (2013.01); *B29C 64/112* (2017.08); *B29C 64/386* (2017.08);
(Continued)

(58) Field of Classification Search
CPC ............. B22F 2003/1057; B22F 3/008; B29C 64/112; B29C 64/386; B29C 64/393;
(Continued)

(56) References Cited

U.S. PATENT DOCUMENTS

| 6,213,579 B1 * | 4/2001 | Cornell | ................... B41J 2/0454 347/14 |
| 6,375,874 B1 | 4/2002 | Russell | |

(Continued)

FOREIGN PATENT DOCUMENTS

| CN | 103842157 A | 6/2014 |
| CN | 103980592 A | 8/2014 |

(Continued)

OTHER PUBLICATIONS

Paula Elias, Halftoning for Multi-Channel Printing, 2014, Department of Science and Technology Linköping University, Norrköping, Sweden, pp. 1-114. (Year: 2014).*

(Continued)

*Primary Examiner* — Kidest Bahta
(74) *Attorney, Agent, or Firm* — HP Inc. Patent Department

(57) ABSTRACT

Adjustment of a halftoning threshold can, in an example implementation, include assigning a relative energy value, relative to a reference energy value, to a location of a build area and adjusting a halftoning threshold based on the relative energy value.

20 Claims, 4 Drawing Sheets

(51) Int. Cl.
  *B33Y 10/00* (2015.01)
  *B33Y 50/00* (2015.01)
  *B29C 64/112* (2017.01)
  *B29C 64/386* (2017.01)
  *B33Y 30/00* (2015.01)
  *B33Y 50/02* (2015.01)
  *B29C 64/393* (2017.01)
  *B22F 3/00* (2006.01)
  *B22F 3/105* (2006.01)
  *H04N 1/405* (2006.01)

(52) U.S. Cl.
  CPC ............ *B29C 64/393* (2017.08); *B33Y 10/00* (2014.12); *B33Y 30/00* (2014.12); *B33Y 50/00* (2014.12); *B33Y 50/02* (2014.12); *B22F 3/008* (2013.01); *B22F 2003/1057* (2013.01); *G05B 2219/49023* (2013.01); *H04N 1/405* (2013.01); *Y02P 10/295* (2015.11)

(58) Field of Classification Search
  CPC ......... B33Y 10/00; B33Y 30/00; B33Y 50/00; B33Y 50/02; G05B 19/4099; G05B 2219/49023; H04N 1/405; Y02P 10/295
  See application file for complete search history.

(56) References Cited

U.S. PATENT DOCUMENTS

| | | | |
|---|---|---|---|
| 8,573,731 B2 | 11/2013 | Bastani | |
| 8,675,251 B2 | 3/2014 | Blum | |
| 8,705,144 B2 | 4/2014 | Gullentops et al. | |
| 2002/0196310 A1* | 12/2002 | Inoue | H04N 1/4058 347/43 |
| 2006/0170975 A1* | 8/2006 | Wang | H04N 1/4058 358/3.06 |
| 2007/0071469 A1* | 3/2007 | Ravitz | G03G 15/045 399/49 |
| 2011/0260365 A1 | 10/2011 | El-Siblani | |
| 2013/0076817 A1 | 3/2013 | Olson | |
| 2014/0233069 A1* | 8/2014 | Wu | H04N 1/4051 358/3.13 |

FOREIGN PATENT DOCUMENTS

| | | |
|---|---|---|
| EP | 1437882 | 7/2004 |
| EP | 2199065 | 6/2010 |
| JP | 2013123809 A | 6/2013 |
| WO | WO-2012-115441 | 8/2012 |

OTHER PUBLICATIONS

Zhou, et al; "Three-Dimensional Digital Halftoning for Layered Manufacturing Based on Droplets"; May 24, 2009; http://www-bcf.usc.edu/~yongchen/Research/NAMRC%2037-Haltoning_Final.pdf.

Cho, et al; "A Dithering Algorithm for Local Composition Control with Three-dimensional Printing"; Dec. 21, 2001; http://www.mit.edu/~tdp/info-flow/publications/dither_algo.pdf.

* cited by examiner

ADJUSTMENT OF A HALFTONING THRESHOLD

BACKGROUND

A three-dimensional object can be rendered. Rendering a three-dimensional object can include generating a model (e.g., graphical, mathematical, etc.) of the object. An object model of the three-dimensional object can be generated utilizing a halftoning method. Halftoning can include simulating various continuous tones using a limited amount of tone elements (e.g., binary, a range of tones that is limited in comparison to a set of input continuous tones, etc.). For example, an image of an object can have a large range of continuous tones associated therewith. However, an image rendering device can have significantly fewer tones available for rendering the image. For example, a printer can be limited to a binary tone for rendering the image (e.g., fire a dot or not). In a printer, halftoning can convert continuous tone data such as a printing fluid quantity into dots that can be printed on a page.

Additive manufacturing can use a mechanism to successively deposit a material to build up a three-dimensional (3-D) object. 3-D printing can be one such mechanism of additive manufacture. 3-D printed objects can be additively manufactured based on a three-dimensional object model.

DETAILED DESCRIPTION

Figure 1:
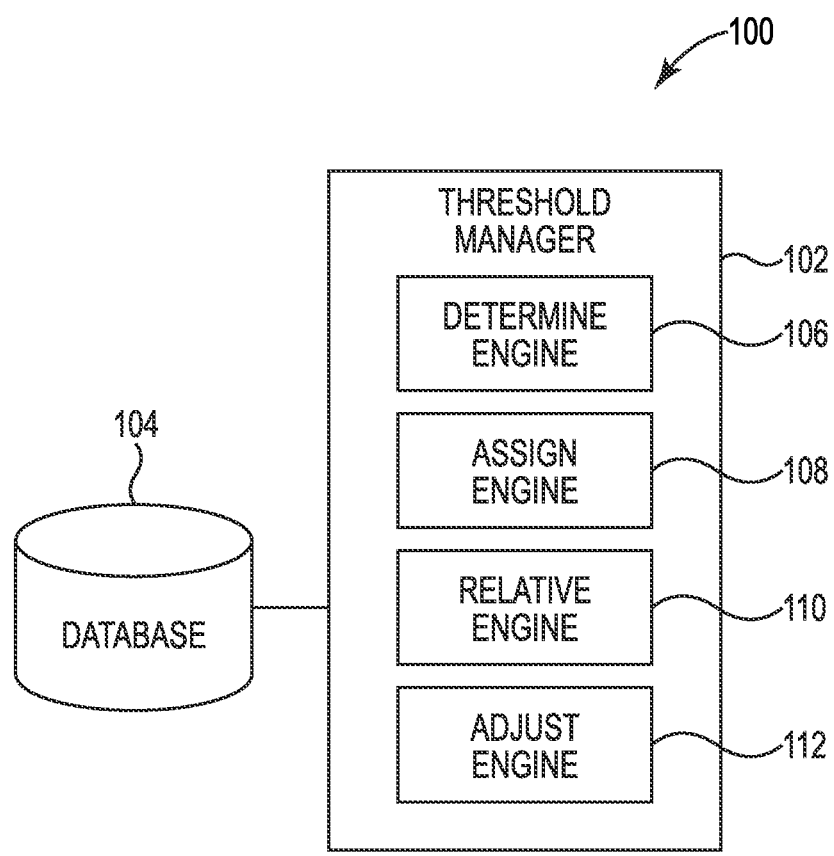
FIG. 1 illustrates a diagram of an example of a system of adjustment of a halftoning threshold according to the present disclosure.

Additive manufacturing techniques including three-dimensional (3-D) printing have gained acceptance for the ability to rapidly reproduce high-quality parts from computer-aided design (CAD) specifications, scans of a 3-D object, computer generate objects, etc. Improved additive manufacturing techniques enable the production of increasingly sophisticated objects.

Additive manufacturing devices (e.g., 3-D printers) can operate utilizing a variety of mechanisms. For example, an additive manufacturing device can operate by spreading a layer of a build material (e.g., a thermoplastic powder) upon a build area (e.g., a portion of a bed of a 3-D printer upon which 3-D objects are additively manufactured).

The additive manufacturing device can apply a printing agent. As used herein, a printing agent can be an agent (e.g., a composition of matter in a solid, liquid, gas, gel, colloid, etc. form that produces an effect in the additive manufacturing process) that is printable and/or printed by an additive manufacturing device. An agent that is printable can include an agent that can be delivered through an agent delivery mechanism of an additive manufacturing device. For example, a printing agent can be ejected from a printing agent dispensing nozzle within a nozzle array of a 3-D printing device.

The printing agent can be an agent that modulates energy absorption by a second material and/or transforms the properties of a second material. The second material can be a build material. The build material can be a material that can be transformed into the 3-D object. The build material can be, for example, a thermoplastic powder, which can melt and then solidify. For example, the printing agent can include a fusing agent that acts as an energy absorber to transfer an increased quantity of applied energy to the second material relative to untreated build material. In an example, the fusing agent can be a liquid material that absorbs radiation applied by an energy source of the additive manufacturing device (e.g., absorbs particular wavelengths of radiation applied from a lamp, which can be within and/or outside of the visible spectrum). The fusing agent can, in an example, be a dark colored (e.g., black) thermal absorber and/or a colorless thermal absorber (e.g., Ultraviolet (UV) absorbers).

The printing agent can be selectively applied to portions of the build material within the build area of an additive manufacturing device such as a 3-D printer. The printing agent can be delivered (e.g., printed) via a printing agent delivery mechanism such as a printing agent dispensing nozzle and/or an array of printing agent dispensing nozzles.

The additive manufacturing device can deliver energy to the build material. The energy can be delivered from lamps (e.g., an overhead lamp and/or an array of near infrared lamps situated above the build area). The energy delivered from the lamps can be selectively absorbed by portions of the build material. For example, the portions of the build material treated with a printing agent, such as a fusing agent, can absorb more of the delivered energy than a lighter color and/or less energy absorptive build material. The build material in those areas can be transformed to a solid (e.g., solidify and coalesce to form a solid). The additive manufacturing device can index (e.g., move in a z-axis where the x-axis corresponds to a first dimension, a y-axis corresponds to a second dimension, and the z-axis corresponds to a third dimension) and spread a new layer of build material and repeat the process, building a 3-D object one layer at a time.

Additive manufacturing devices can be non-uniform. That is, additive manufacturing devices may have inherent variations among some of their components. These variations may result in additive manufacturing devices not being identical in every measure across individual devices. Furthermore, each additive manufacturing device may not be uniform in its energy delivery across a build area. That is, each additive manufacturing device may not be able to uniformly deliver energy to build material upon a build area due to inherent component variations.

The non-uniformity of energy delivery across the build area of an additive manufacturing device can be the result of an inherent lack of uniformity in the components from which the additive manufacturing device is constructed. For example, an array of lamps which are used to heat the build material on the build area (e.g., transfer energy to the build material) can lack uniformity. Despite being rated for the same output, two lamp bulbs can vary in physical properties (e.g., variations in the physical materials from which the bulbs are constructed, etc.) and/or construction (e.g., the uniformity in application of gold reflectors to the bulbs, etc.) that affect the effective energy output of the bulbs. The cost of manufacturing a device that has precisely identical bulbs is substantially higher and over a period of use it is likely that the previously identical bulbs would lose uniformity.

Moreover, the arrangement of the bulbs in an array can be non-uniform. Slight defects can occur when placing the bulbs in an array that result in the non-uniformity. The non-uniform placement of the bulbs in the array can additionally contribute to variations in energy delivery across a build area.

An additional source of non-uniformity in energy delivery in the build area of an additive manufacturing device can be the nozzles. That is, individual printing agent dispensing nozzles in an array of nozzles can vary in the amount of printing agent they dispense. Since the printing agent can include energy absorbing, energy absorption retarding printing agents, a printing agent that modifies a degree of coalescence of the build material, etc., the amount of agent that they dispense can affect the energy delivery across the build area. For example, if build material on two distinct portions of the build area can have printing agent applied by two distinct nozzles in the nozzle array and the two nozzles dispense non-uniform amounts despite being instructed to dispense the same volume, then those two portions may absorb different amounts of energy.

Non-uniform energy delivery can result in defects of a 3-D object being additively manufactured. The defects can include too much coalesced and solidified build material, not enough coalesced and solidified build material, improper density of coalesced and solidified build material, an incorrect degree of coalescence and/or solidification, etc. Non-uniformity in energy delivery can result in part warpage, poor object qualities, poor surface properties of the object, poor accuracy, poor object strength, poor inter-layer bonding, etc. These defects can render an additive manufacturing device unsuitable for creation of particular 3-D objects, it can limit the resolution of the device, and it can add time and materials to the additive manufacturing process.

Further, the non-uniformity in energy can also limit the amount of usable build area. For example, a build area of an additive manufacturing device can suffer conductive, convective, and radiative losses of applied energy from its outer edges. This energy loss can result in a build area with outer portions that are comparatively cool. These outer portions may not be utilized due to the inability to reliably deliver energy in a uniform manner across these locations.

Unlike methods of attempting to avoid non-uniformity by utilizing costly and labor intensive front-end quality control measures (e.g., to ensure identical parts and construction), examples of the present disclosure describe a system, method, and computer readable medium of adjustment of a halftoning threshold. Desirably, adjustment of a halftoning threshold can adjust energy delivery resulting in a uniform delivery of energy. For example, a halftoning process, in its most abstract form, can involve comparing incoming data corresponding to an object to a threshold value. If the incoming data exceeds the threshold, a drop of printing fluid can be placed in the location corresponding to the data. By adjusting a halftone threshold value in a manner corresponding with a physical location in the build area of an additive manufacturing device, the quantity of energy absorbing material dispensed in the particular location can be increased or decreased. Increasing or decreasing the amount of energy absorbing material in a location can modify the energy absorbed in those particular areas. This adjustment of halftone thresholds corresponding to physical locations across a build area can be utilized to compensate for spatial energy variations across the build area such as some locations of the build area receiving and/or absorbing more energy than other locations despite having identical target energy values. Similarly, the adjustment of halftone threshold values corresponding to specific physical printheads or nozzles can be utilized to compensate for variations in delivered volume.

Moreover, the two compensations, spatial energy variation and delivered volume variation, can be combined. For example, adjustment of a halftoning threshold can include assigning a reference energy value to a first location, assign a relative energy value to a second location, and adjust a halftoning threshold for the second location based on the relative energy value.

FIG. 1 illustrates a diagram of an example of a system 100 for adjustment of a halftoning threshold according to the present disclosure. The system 100 can include a database 104, a threshold manager 102, and/or a number of engines (e.g., determine engine 106, assign engine 108, relative engine 110, adjust engine 112). The threshold manager 102 can be in communication with the database 104 via a communication link, and can include a number of engines (e.g., determine engine 106, assign engine 108, relative engine 110, adjust engine 112). The threshold manager 102 can include additional or fewer engines than are illustrated to perform the various functions as will be described in further detail.

The number of engines (e.g., determine engine 106, assign engine 108, relative engine 110, adjust engine 112) can include a combination of hardware and programming, but at least hardware, that is to perform functions described herein (e.g., determine an actual energy value of a first location of a plurality of locations of a build area, assign a reference energy value to the first location, assign a relative energy value to a second location of the plurality of locations based on the references energy value, adjust a halftoning threshold for the second location based on the relative energy value, etc.). The programming can include program instructions (e.g., software, firmware, etc.) stored in a memory resource (e.g., computer readable medium, machine readable medium, etc.) as well as hard-wired programs (e.g., logic).

The determine engine 106 can include hardware and/or a combination of hardware and programming, but at least hardware, to determine an actual energy value of a first location of a plurality of locations of a build area. The first location can include a reference location of the build area. The first location can include a portion of the build area receiving the comparatively highest amount of energy, a center of the build area, a hottest location of the build area, a portion of the build area monitored by a temperature control system, a portion of the build area where a nozzle of a plurality of nozzles with a comparatively highest drop weight deposits an amount of printing agent such as an energy absorber material, etc. The actual energy value can include a value corresponding to a measured amount of energy delivered at that location.

The assign engine 108 can include hardware and/or a combination of hardware and programming, but at least hardware, to assign a reference energy value to the first location. Assigning a reference energy value can include assigning a value to substitute for the actual energy value of the first location. The reference energy value can include a value that is a highest value on a scale of relative values. For instance, the reference energy value can be one at the first location where the first location is the location receiving the comparatively highest amount of energy.

The relative engine 110 can include hardware and/or a combination of hardware and programming, but at least hardware, to assign a relative energy value to a second location of the plurality of locations based on the reference energy value. The relative energy value can be assigned based on an actual energy value of the second location relative to an actual energy value of the first location. The relative energy value can include a value on the scale of relative values that reflects the relationship between the actual energy value of the first location and the actual energy value of the second location. For example, if the first location has a reference value of one and the second location has an actual energy value that is half that of the actual energy location of the first location, then the second location can be assigned a relative energy value of five tenths.

The adjust engine 112 can include hardware and/or a combination of hardware and programming, but at least hardware, to adjust a halftoning threshold for the second location based on the relative energy value. Halftoning can be used to correct for variations in energy delivery and/or in printing agent delivery. The pattern of printing agent, such as an energy absorbing printing agent, can be halftoned. The halftoning process can include comparing the incoming object data from a 3-D object model to a threshold value at each location. If the incoming data exceeds the threshold then a drop of printing agent of a particular amount can be placed at that location. By adjusting the halftone threshold value in a manner corresponding to the physical location of the build area, the quantity of printing agent dispensed in those locations can be increased or decreased leading to a corresponding increase or decrease in the energy absorbed in those locations. Adjusting the halftoning threshold for the second location can include adjusting the halftoning threshold to reduce or increase the amount of printing agent dispensed in the location so that the energy delivered to the first location and the second location is uniform. For example, if the first location is the hottest portion of the build area having a reference energy value of one and the second location is a relatively cooler portion of the build area having a relative energy value of five tenths, then the halftoning threshold of the second location may be adjusted so that the same input data at both locations results in additional printing agent being dispensed at the second location to cause the energy delivered to the build material at both locations to be uniform.

The system 100 can additionally include a comparison engine that can include hardware and/or a combination of hardware and programming, but at least hardware, to compare an incoming 3-D object model pixel value corresponding to the second location to the adjusted halftone threshold to determine element placement. A 3-D object model can be compared pixel by pixel to a halftoning threshold to determine placement/amounts of printing agent. The 3-D object model can be converted to a halftoned map of printing agent to be dispersed at particular locations where the placement/amounts of printing agent are represented by placed elements in particular locations of a halftoning map. Determining whether an element should be placed in the halftoning map can be accomplished by comparing an energy value assigned to a corresponding pixel of the 3-D object model to the halftone threshold for the location corresponding to that pixel. For example, if the pixel value exceeds the halftoning threshold then an element can be placed. Since the halftone thresholds have been adjusted to compensate for energy delivery non-uniformity, the incoming pixel values from the 3-D object model can be compared to the adjusted halftone threshold values for each location when determining where to place elements in the halftoning map.

A device such as a 3-D printing device can execute the system 100. For example, a 3-D printer can cause to be executed and/or execute a number of engines (e.g., determine engine 106, assign engine 108, relative engine 110, adjust engine 112). The 3-D printing device can execute the system 100 can execute the system utilizing integral, ancillary, and/or separate software, hardware, firmware, and/or logic to perform functions described herein.

Figure 2:
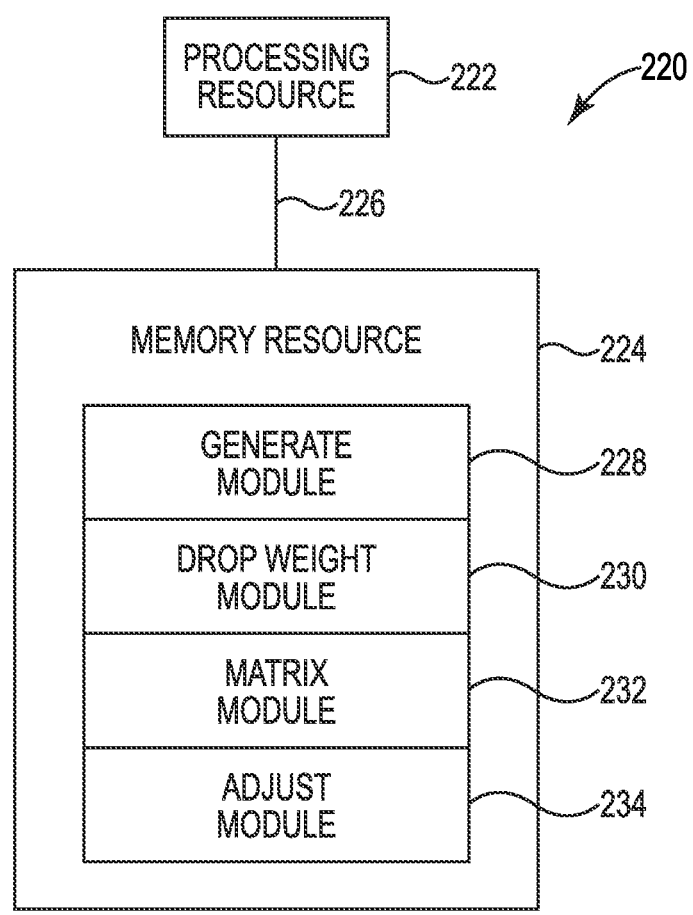
FIG. 2 illustrates a diagram of an example of a computing device according to the present disclosure.

FIG. 2 illustrates a diagram of an example of a computing device 220 according to the present disclosure. The computing device 220 can utilize software, hardware, firmware, and/or logic to perform functions described herein.

The computing device 220 can be any combination of hardware and program instructions to share information. The hardware, for example, can include a processing resource 222 and/or a memory resource 224 (e.g., non-transitory computer-readable medium (CRM), machine readable medium (MRM), database, etc.). A processing resource 222, as used herein, can include any number of processors capable of executing instructions stored by a memory resource 224. Processing resource 222 can be implemented in a single device or distributed across multiple devices. The program instructions (e.g., computer readable instructions (CRI)) can include instructions stored on the memory resource 224 and executable by the processing resource 222 to implement a desired function (e.g., generate a spatial energy map of a portion of a build area, generate a nozzle drop weight map of the portion of the build area, generate a two-dimensional (2-D) matrix of a relative energy value received at each of a plurality of addressable locations of the portion of the build area based on the spatial energy map and the nozzle drop weight map; adjust a halftoning threshold for an addressable location of the plurality of addressable locations based on the 2-D matrix; etc.).

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., generate module 228, drop weight module 230, matrix module 232, adjust module 234, etc.) can include CRI that when executed by the processing resource 222 can perform functions. The number of modules (e.g., generate module 228, drop weight module 230, matrix module 232, adjust module 234, etc.) can be sub-modules of other modules. For example, the generate module 228 and the drop weight module 230 can be sub-modules and/or contained within the same computing device. In another example, the number of modules (e.g., generate module 228, drop weight module 230, matrix module 232, adjust module 234, etc.) can comprise individual modules at separate and distinct locations (e.g., CRM, etc.).

Each of the number of modules (e.g., generate module 228, drop weight module 230, matrix module 232, adjust module 234, etc.) can include instructions that when executed by the processing resource 222 can function as a corresponding engine as described herein. For example, the generate module 228 and drop weight module 230 can include instructions that when executed by the processing resource 222 can function as the determine engine 106. In another example, the matrix module 232 and the adjust module 234 can include instructions that when executed by the processing resource 222 can function as the relative engine 110 and the adjust engine 112, respectively.

The generate module 228 can include CRI that when executed by the processing resource 222 can generate a spatial energy map of a portion of the build area. As used herein, a spatial energy map can be a representation of the energy received by build material at each of a plurality of locations of the build area of an additive manufacturing device. The spatial energy map can be generated based on measurements captured from portions of the build area. The spatial energy map can additionally or alternatively be generated based on measurements of a test part created at a portion of the build area. The measurements can be measurements of: physical properties of the build area, the build material, the printing agent, the additive manufacturing device, and/or the test parts produced by the additive manufacturing device that can be indicative of the amount of energy received by the build material at each of a plurality of locations of the build area.

The drop weight module 230 can include CRI that when executed by the processing resource 222 can generate a nozzle drop weight map of the portion of the build area. As used herein, a nozzle drop weight map can be a representation of the size and/or quantity of absorbing energy absorbing material in a drop of printing agent deposited by a nozzle for each location of the build area. In some examples, the drop weight map can be a representation of the size and/or quantity of absorbing energy absorbing material in of a drop of printing agent deposited by a nozzle for each location/element of the 3-D object model.

The matrix module 232 can include CRI that when executed by the processing resource 222 can generate a two-dimensional (2-D) matrix of a relative energy value received at each of a plurality of addressable locations. The relative energy values can be assigned relative to a reference energy value assigned to a portion of the build area where the build material is determined to be receiving a comparatively highest amount of energy. That is, the relative energy values can be assigned based on the spatial energy and nozzle drop weight at each of a plurality of addressable locations relative to the spatial energy and nozzle drop weight at a reference location.

The addressable location can be a location on the build area. The addressable location can be a location of the build area corresponding to a voxel in a layer of a 3-D object model. For example, the addressable location can be a location of a build area where a voxel of the 3-D object model will be created. A layer of a 3-D object model can include a portion of the 3-D object model corresponding to an iteration of the additive manufacturing process. That is, a layer of a 3-D object model can correspond to all of the elements of the 3-D object that will be manufactured before indexing and laying down more build material.

As used herein, a voxel can refer to a smallest addressable location of a 3-D object addressable by an additive manufacturing device. In some examples, a voxel can be two hundredths of a millimeter square or smaller. The voxel can correspond to a point on a 3-D object model (e.g., a computer-aided design (CAD) 3-D object model) or a conversion thereof to a compatible format. A voxel can include a highest resolution point, as described herein, where an additive manufacturing device can place a material.

The addressable location can be a location of the build area corresponding to a region of voxels in a layer of a 3-D object model. That is, the addressable location can be a plurality of voxels of the 3-D object model that correspond to a portion of the build area.

The adjust module 234 can include CRI that when executed by the processing resource 222 can adjust a halftoning threshold for an addressable location of the plurality of addressable locations based on the 2-D matrix of relative energy values received at each of the plurality of addressable locations. Adjusting the halftoning threshold can include applying an offset to each incoming pixel value of a 3-D object model. For example, an offset can include an amount and/or a function applicable to an incoming pixel, the pixel value corresponding to a quantity of energy absorbing material to be applied in a physical location of the build area according to the 3-D object model. The incoming pixel value can be adjusted by applying the offset to the value. The result of applying the offset can be a transformation of the incoming pixel value to an adjusted pixel value. The adjusted pixel value can be compared to the halftoning threshold for the corresponding location to determine the quantity of energy absorbing material to be applied in the location.

Figure 3:
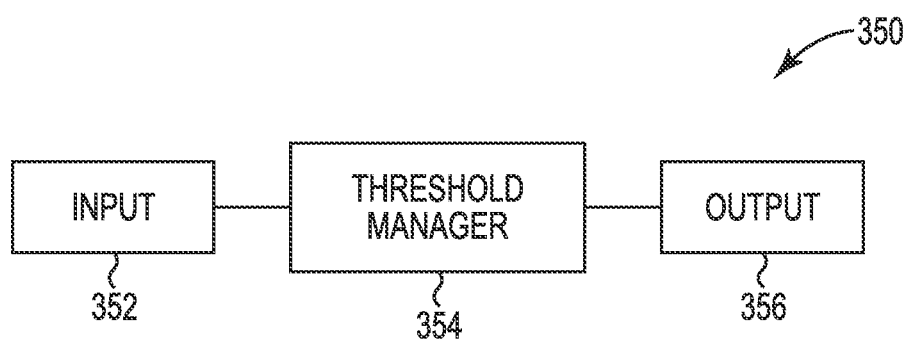
FIG. 3 illustrates an example of an environment suitable for adjustment of a halftoning threshold according to the present disclosure.

FIG. 3 illustrates an example environment 350 suitable for adjusting a halftoning threshold according to the present disclosure. The environment 350 is shown to include an input 352, a threshold manager 354, and an output 356.

The environment 350 can include an input. The input 352 can include a 3-D object model. The 3-D object model can include a computer-aided design file for a 3-D object structure and/or a conversion thereof to a compatible format. That is, the 3-D object model can be a model of a 3-D target structure to additively manufacture. That is, the 3-D model can be a graphical and/or mathematical representation of a 3-D object to be created via additive manufacturing where the 3-D object has variable target density fills (e.g., an density value for the density of the material deposited at the location as specified in the 3-D object model) associated with distinct portions or materials thereof. The input 350 can be the entire 3-D object or a portion of the entire 3-D object to be additively manufactured.

The environment 350 can include a threshold manager 354. The threshold manager 354 can determine amounts of energy absorbed at a build area. The threshold manager 354 can determine the amounts of energy that each portion of a build area receives and/or absorbs. The amount of energy that a portion of a build area receives can be an amount of energy that a portion of the build material located at that portion of the build area receives. The threshold manager 354 can determine the amount of energy (e.g., actual energy value) that each portion receives based on various measurements. For example, the threshold manager 354 can determine an amount of energy that a portion of the build area receives using a direct feedback device such as an infrared (IR) camera and/or scanning IR temperature sensor. These devices can be on board the additive manufacturing device and can measure the temperature and/or amount of radiation being emitted and/or absorbed in a particular area. The amount of energy that a portion of a build area receives can be determined based on these measurements.

Additionally, the threshold manager 354 can determine the amount of energy that a portion of the build area receives utilizing measurements of test objects additively manufactured within that portion of the build area. Small test objects can be additively manufactured in an array over the whole build area and the objects can thereafter be evaluated. The evaluation can be performed on-board the additive manufacturing device or performed using a separate or ancillary device. The evaluation can include: collecting measurements of the extent of curing of the objects, the weight of completed objects of known volume, the internal feature (e.g., holes) size of the object, optical density of the object, surface finish of the object (e.g., the absorbance, gloss, or roughness of the surface of the object which can be a measure of flow leveling which is a function of viscosity which varies with the temperature reached), darkness/color of objects (which can be a measure of scattering due to incomplete melting of the build material), reflectivity of the objects (another measure of scattering), yield strength, elongation, and/or other metrics. The measurements of the test objects can be targeted to determine if a test object manufactured at a portion of the build area was fully solidified and/or received past a certain threshold of energy (e.g., a threshold quantity of energy to fully melt and/or solidify a layer of the object). Various methods of measuring the test objects to determine these properties can be utilized. For example, such methods can be utilized as those disclosed in PCT application Ser. No. PCT/US2014/032341 filed on Mar. 31, 2014, entitled "GENERATING A THREE-DIMENSIONAL OBJECT," the entire contents of which are hereby incorporated herein by reference. The measurements of the test objects can measure properties that are a function of the energy received at the portion of the build area where the object was manufactured. The threshold manager 354 can determine an amount of energy received/absorbed at a location of the build area based on the measurements.

The threshold manager 354 can also determine drop weight uniformity among printing nozzles. The threshold manager can make this determination based on a measurement of the properties of the drops of printing agent ejected by a printing nozzle onto a portion of the build area. The threshold manager 354 can determine which nozzle of an array of nozzles will be ejecting printing agent onto which position of the build area based on the alignment of the nozzle array with respect to the build area and/or determining which nozzle is assigned to eject a printing agent to a portion of a 3-D object model corresponding to a location of the build area.

Measurements of the properties of the drops of printing agent can be performed by measurement devices integral to the additive manufacturing device and/or measurement devices ancillary or separate from the device. For example, the drops of printing agent ejected by a nozzle can be measured by a detector to measure their size. For example, the drops ejected can be subjected to an optical size or density measurement, charge measurement, and weight measurement. In an example, the threshold manager 354 can optically measure ejected drops with a drop detector, an IR interference sensor, or a reflectometer. In another example, the ejection of the printing agent can be performed on a different substrate such as a piece of paper and the paper can be scanned to determine the properties of the drops ejected from each nozzle. The drop weight of the printing agent ejected from a nozzle can be a function of these metrics. The drop weight of printing agent ejected from a nozzle can be determined based on these measurements.

The threshold manager 354 can generate a spatial energy map of portions of the build area. Generating a spatial energy map can include generating a matrix that describes the amount of energy that is being delivered to and/or absorbed by the build material upon each portion of the build area. The spatial energy map can be constructed from the amount of energy that a portion of a build area receives as determined based on the measurements discussed above.

The threshold manager 354 can generate a nozzle drop weight map corresponding to portions of the build area. Generating a nozzle drop weight map can include generating a matrix describing how much printing agent will actually be ejected onto a portion of the build area from a particular nozzle in relation to how much the nozzle is instructed to eject. The drop weight map can be constructed from the measurements discussed above.

The threshold manager 354 can generate a hybrid map with elements corresponding to portions of the build area. Generating a hybrid map can include constructing a matrix that describes the super-position of the spatial energy map and the nozzle drop weight map. That is, a hybrid map can describe, for any given addressable position of a build area, the amount of energy that is being delivered and/or absorbed and the amount of printing agent that will be ejected from the printing nozzle.

The threshold manager 354 can assign a reference energy value to a reference location of the build area. The reference location can be a location of the build area that is receiving the comparatively highest amount of energy delivered and/or absorbed. The reference location can be the comparatively warmest part of the build area, a location of the build area monitored by a temperature control system, and/or the center of the build area. The reference location can be assigned a reference energy value representing a relative value on a scale of energy values. For example, the location of the build area receiving and/or absorbing the greatest amount of energy can be assigned the reference value of one.

The threshold manager 354 can assign relative energy values to the non-reference locations of the build area. The relative energy values can be values that are generated relative to the reference energy value. The relative energy values can be relative values on the same scale of energy values upon which the reference value is based. A relative energy value can share a proportional relationship to the reference energy values approximate to the relationship between the measured values from the reference location and the location corresponding to the relative energy value being assigned. For example, if a measured amount of energy received and/or absorbed at a non-reference location is half of the measured amount of energy received and/or absorbed at a reference location having a reference energy value of one, then the non-reference location can be assigned a relative energy value of five tenths. The relative energy values can additionally be based on the nozzle drop weight for the nozzle corresponding to the non-reference location corresponding to the relative energy value being assigned. Alternatively, the threshold manager 354 can assign a separate reference value and relative values to locations of the build area based on the nozzle drop weight for the corresponding nozzles.

The threshold manager 354 can generate a 2-D matrix of the relative energy values received and/or absorbed at each of a plurality of addressable locations making up a portion of a build area. The 2-D matrix can be based on exclusively the assigned values corresponding energy received and/or absorbed, exclusively the assigned values corresponding to nozzle drop weight, and/or assigned values corresponding energy received and/or absorbed and the nozzle drop weight. For example, the 2-D matrix can describe the super-position of the spatial energy map and the nozzle drop weight map. The 2-D matrix can be constructed based on the spatial energy map and/or the nozzle drop weight map.

The threshold manager 354 can utilize the 2-D matrix in generating and applying an adjustment to a halftoning threshold. For example, an original threshold value that would be utilized for performing halftoning at each spatial location of the build area can be multiplied by a value or an inverse value of those assigned in the 2-D matrix of the relative energy values for that spatial location prior to comparison with an incoming pixel value for that spatial location from a 3-D object model.

In a case of matrix halftoning with a matrix sized to the entire build area, the matrix may be multiplied by the 2-D matrix relative energy values prior to additively manufacturing to reduce the burden on processing resources. If the matrix is smaller than the build area (e.g., 100 pixels wide by 100 pixels tall) the matrix can be tiled to make a larger matrix prior to multiplication by the 2-D matrix relative energy values. Depending on the availability of memory and computing resources, a matrix of the full size of the build area can be stored (e.g., computationally limited) or the matrix can be recomputed each time it is tiled (e.g., memory limited).

Where each element of the halftone matrix is the same size as the locations of the build area measured for energy delivery variation, and therefore the elements of the 2-D matrix, a set of halftone matrices can be pre-computed (e.g., prior to additive manufacturing) by multiplying all elements of the original halftone matrix by a single value and storing multiple copies of the matrix modified by different multiplier values. The adjusted pre-computed table can be selected by indexing using the multiplier value for the spatial location of the build area being halftoned.

In another example, error diffusion halftoning can be utilized. In error diffusion halftoning, the 3-D object model is halftoned pixel by pixel through the entire 3-D object. In this type of error diffusion a pointer can be maintained on a reference location of the 2-D matrix and the threshold value used for error diffusion can be adjusted based on the value from the 2-D matrix. For example, the original threshold value for error diffusion can be multiplied by the value or the inverse value from the 2-D matrix. In the case of tone-dependent error diffusion where the error terms are pre-computed and stored in a lookup table for each incoming tone level, the 2-D matrix can be converted into a map of lookup index offsets which can be added to the incoming tone value when looking up location energy values and error terms. A map of lookup index offsets can be a map having elements corresponding to a number of locations of the build area and/or of the 3-D object model. Each element of the lookup index offset map can include a reference to an offset and/or the offset itself applicable to an incoming pixel value (e.g., tone value) to normalize the value (e.g., adjust the value to achieve spatial energy uniformity across a build area).

The halftoning process can be repeated for each pixel and/or voxel in a layer of the 3-D object being built and then repeated for each additional layer being built. The threshold manager 354 can generate and apply the adjustments to the halftoning thresholds throughout the entire halftoning process.

The environment 350 can include an output 356. The output can include a halftoned 3-D object model wherein the thresholds utilized in generating the halftoned 3-D object model were the adjusted thresholds. The halftoned 3-D object model can be utilized as a map suitable to additively manufacture a physical replica of the 3-D object (e.g., via a 3-D printer). The halftoned 3-D object model can be a map describing the amount of a printing agent such as an energy absorbing material to be applied in each location of the build area to additively manufacture a physical replica of the 3-D object. The halftoned 3-D object model can be utilized in generating and executing 3-D printing (e.g., additive manufacturing) instructions with a 3-D printer (e.g., depositing build material, applying printing agent, applying energy to the build area, selectively melting and solidifying the building agent in the build area, indexing and creating a successive layer of a 3-D object by repeating the process, etc.). The halftoned 3-D object model can be generated and/or adapted while performing a 3-D printing operation. That is, generating and adapting the halftoned 3-D object model can occur in substantially real-time during the 3-D printing operation and the measurements can be measurement captured in substantially real-time during the operation. Alternatively, the halftoned 3-D object model can be output prior to performing the 3-D printing operation, Adjusting a halftone threshold can result in delivery of a more consistent amount of energy across the surface of the build area by compensating for spatial energy variations and/or physical printhead/nozzle delivered volume variation through software rather than by adding more expensive hardware. Additionally, the adjusting the halftone threshold can generate more consistent and accurate 3-D object geometry and object part properties. In addition to improved control and quality of 3-D object creation, adjusting the halftone threshold can enable utilization of a larger portion of a build area and/or larger build areas while maintaining the uniformity of energy absorption by the build material. Therefore, adjusting the halftone threshold can allow for the additive manufacture of comparatively larger 3-D object sizes.

Figure 4:
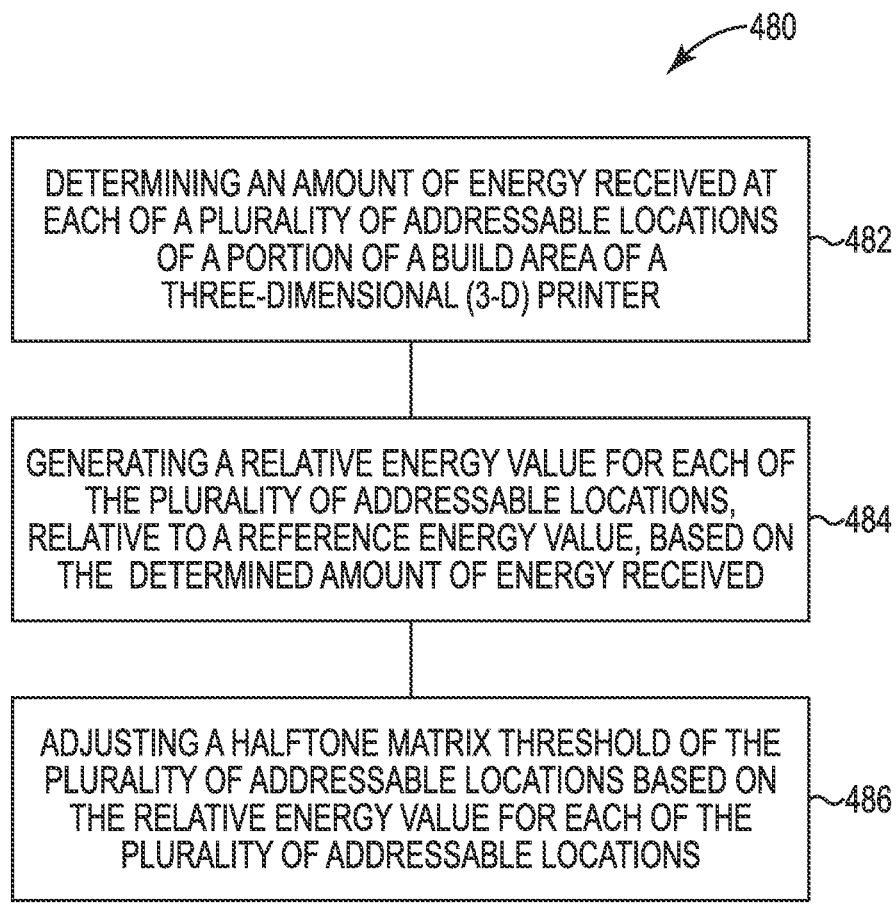
FIG. 4 illustrates a flow chart of an example of a method of adjustment of a halftoning threshold for three-dimensional (3-D) printing according to the present disclosure.

FIG. 4 illustrates a flow chart of an example of a method 480 of adjustment of a halftoning threshold for three-dimensional (3-D) printing. The method 480 can determine an amount of energy received at each of a plurality of addressable locations of a portion of a build area of a 3-D printer, generate a relative energy value for each of the plurality of addressable locations, relative to a reference energy value, based on the determined amount of energy received, and adjust a halftone matrix of the plurality of adjustable locations based on the relative energy value for each of the plurality of addressable locations. In some examples, the method 480 can be performed utilizing a system (e.g., system 100 as referenced in FIG. 1) and/or a computing device (e.g., computing device 220 as referenced in FIG. 2).

As illustrated at 482, the method 480 can include determining an amount of energy received at each of a plurality of addressable locations of a portion of a build area. Determining an amount of energy received at each of a plurality of addressable locations can include collecting measurements of physical properties that can be utilized to determine an amount of energy being received and/or absorbed at each location of a build area. The measurements can be collected during a calibration period and/or during the additive manufacture of a 3-D object. The measurements can be collected on-board the additive manufacturing device or performed using a separate or ancillary device. The measurements can be transformed into amounts of energy via the application of various functions. The build area can be the build area of an additive manufacturing device such as a 3-D printer. The build area can be the portion of a bed of a 3-D printer upon which 3-D objects are additively manufactured.

As illustrated at 484, the method 480 can include generating a relative energy value for each of the plurality of addressable locations relative to a reference energy value. The relative energy value for reach of the plurality of addressable locations can be based on the determined amount of energy received at that addressable location. For example, a reference location of the plurality of addressable locations can be selected based on the location exhibiting a comparatively highest amount of energy absorbed as indicated by the measurements (e.g., the location indicated as having the highest temperature based on measurements from a scanning IR temperature sensor). The reference location can be assigned a reference energy value. The reference energy value can be a value on a relative scale. Where the reference location receives and/or absorbs a comparatively highest amount of energy as compared to the rest of the build area, then the reference location can receive a highest value on a relative scale (e.g., assigning a one on a scale from zero to one).

As illustrated at 486, the method 480 can include adjusting a halftone matrix threshold of the plurality of addressable locations based on the relative energy value for each of the plurality of addressable locations. A halftoning matrix can include a matrix made up of elements corresponding to each addressable element of a 3-D object model and/or a build area of an additive manufacturing device. A halftone matrix threshold can include a threshold value associated with an element of the halftoning matrix. Adjusting the halftone matrix threshold can include multiplying each element of the halftone matrix by the generated relative energy value of a corresponding addressable location of the plurality of addressable locations where the matrix corresponds to the entire build area. Adjusting the halftone matrix threshold can also include selecting a pre-computed adjusted halftone matrix value for a measured addressable location where the matrix corresponds to the size of the measured addressable location.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The figures herein follow a numbering convention in which the first digit or digits correspond to the drawing figure number and the remaining digits identify an element or component in the drawing. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate certain examples of the present disclosure, and should not be taken in a limiting sense.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system of adjustment of a halftoning threshold, comprising:
    a determine engine to determine an actual energy value of a first location of a plurality of locations of a build area;
    an assign engine to assign a reference energy value to the first location;
    a relative engine to assign a relative energy value to a second location of the plurality of locations based on the reference energy value; and
    an adjust engine to adjust a halftoning threshold for the second location based on the relative energy value.

2. The system of claim 1, comprising a comparison engine to compare an incoming three-dimensional (3-D) object model pixel value corresponding to the second location to the adjusted halftone threshold to determine element placement.

3. The system of claim 1, wherein the first location is a center of the build area.

4. The system of claim 1, wherein the first location is a hottest location of the build area.

5. The system of claim 1, wherein the first location is a portion of the build area monitored by a temperature control system.

6. The system of claim 1, wherein the first location is a portion of the build area where a nozzle of a plurality of nozzles with a comparatively highest drop weight deposits an absorber material.

7. A non-transitory computer readable medium storing instructions executable by a processing resource to cause a computer to:
    generate a spatial energy map of a portion of a build area;
    generate a nozzle drop weight map of the portion of the build area;
    generate a two-dimensional (2-D) matrix of a relative energy value received at each of a plurality of addressable locations of the portion of the build area based on the spatial energy map and the nozzle drop weight map; and
    adjust a halftoning threshold for an addressable location of the plurality of addressable locations based on the 2-D matrix.

8. The non-transitory computer readable medium of claim 7, wherein the addressable location is a location of the build area corresponding to a voxel in a layer of a 3-D object model.

9. The non-transitory computer readable medium of claim 7, wherein the addressable location is a location of the build area corresponding to a region of voxels in a layer of a 3-D object model.

10. The non-transitory computer readable medium of claim 7, wherein the spatial energy map is generated based on a measurement captured from the portion of the build area.

11. The non-transitory computer readable medium of claim 7, wherein the spatial energy map is generated based on a measurement of a test part created in the portion of the build area.

12. The non-transitory computer readable medium of claim 7, the instructions executable by the processing resource to cause the computer to adjust the halftoning threshold include instructions to apply an offset to each incoming pixel of a 3-D object model during error diffusion.

13. A method of adjustment of a halftoning threshold for three-dimensional (3-D) printing, comprising:
    determining an amount of energy received at each of a plurality of addressable locations of a portion of a build area of a 3-D printer;
    generating a relative energy value for each of the plurality of addressable locations, relative to a reference energy value, based on the determined amount of energy received; and
    adjusting a halftone matrix threshold of the plurality of addressable locations based on the relative energy value for each of the plurality of addressable locations.

14. The method of claim 13, wherein adjusting the halftone matrix includes multiplying each element of the halftone matrix by the generated relative energy value of a corresponding addressable location of the plurality of addressable locations, and wherein the matrix corresponds to the entire build area.

15. The method of claim 13, wherein adjusting the halftone matrix includes selecting a pre-computed adjusted halftone matrix value for a measured addressable location, and wherein the matrix corresponds to the size of the measured addressable location.

16. The system of claim 1, wherein the adjust engine adjusts the halftoning threshold to make uniform a delivery of energy to the first and second locations based on a quantity of energy absorbing material delivered.

17. The system of claim 1, wherein the relative engine assigns the relative energy value based on an actual energy value of the second location relative to the actual energy value of the first location.

18. The system of claim 1, wherein the assign engine assigns the reference energy value to the first location based on the actual energy value of the first location.

19. The non-transitory computer readable medium of claim 7, wherein the halftoning threshold is adjusted to make uniform a delivery of energy to the plurality of addressable locations based on a quantity of energy absorbing material delivered.

20. The method of claim 13, wherein the halftoning threshold matrix is adjusted to make uniform a delivery of energy to the plurality of addressable locations based on a quantity of energy absorbing material delivered.

\* \* \* \* \*